United States Patent [19]

Troxell

[11] 3,958,665
[45] May 25, 1976

[54] AUTOMOTIVE LIFT WITH AUTOMATICALLY RETURNING FRAME-ENGAGING ARMS

[76] Inventor: Arnold H. Troxell, 1230 Midway Road, Whitehall, Pa. 18052

[22] Filed: June 18, 1975

[21] Appl. No.: 588,044

[52] U.S. Cl. .............................................. 187/8.75
[51] Int. Cl.² ...................... B60S 13/00; B66F 7/00
[58] Field of Search ................. 187/8.41, 8.74, 8.75; 254/93 L

[56] References Cited
UNITED STATES PATENTS

| | | | |
|---|---|---|---|
| 2,949,978 | 8/1960 | Halstead | 187/8.75 |
| 3,035,662 | 5/1962 | Hott | 187/8.75 |
| 3,367,449 | 2/1968 | Pelouch | 187/8.75 |

*Primary Examiner*—John J. Love
*Assistant Examiner*—Jeffrey V. Nase
*Attorney, Agent, or Firm*—John P. Snyder

[57] ABSTRACT

An automotive lift device of the type having a bed plate with laterally swingable arms which are adapted to swing outwardly for engagement beneath the vehicle frame is provided with a freely rotatable lever associated with each arm. When the bed plate is in the lowered position, the arms are forced to lie in horizontal attitudes in which the arms are free to clear them. A shiftable weight associated with each lever causes that end thereof which underlies the outwardly swung arm to rotate downwardly and project below the bed plate when the bed plate is elevated and each end of each arm is provided with a striker such that when the bed plate is again lowered, that end of the lever which has rotated downwardly will strike the support surface and cause the lever to continue in its initial direction of rotation so that the opposite or upstanding end of the lever will engage against its respective arm and will swing it back to its initial position whereby the arms are automatically returned to positions in which the vehicle can be driven away without striking the lift arms.

10 Claims, 9 Drawing Figures

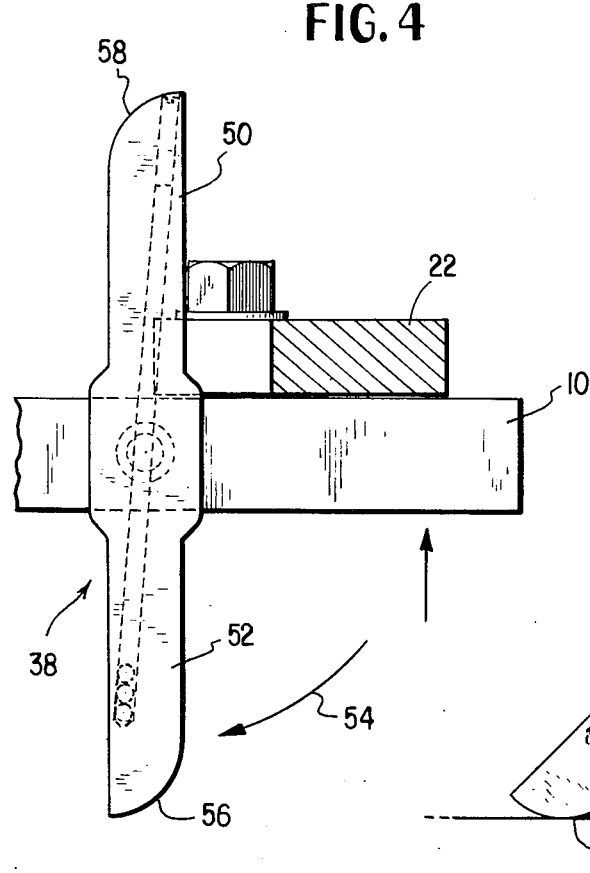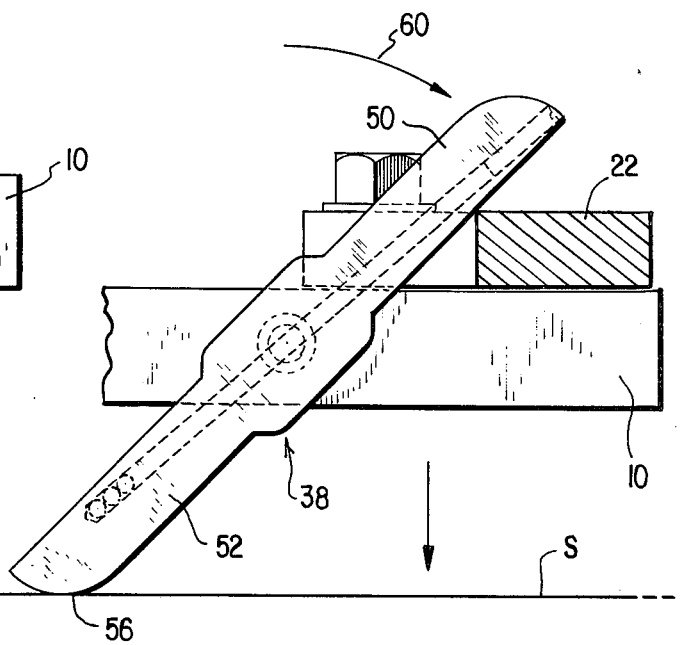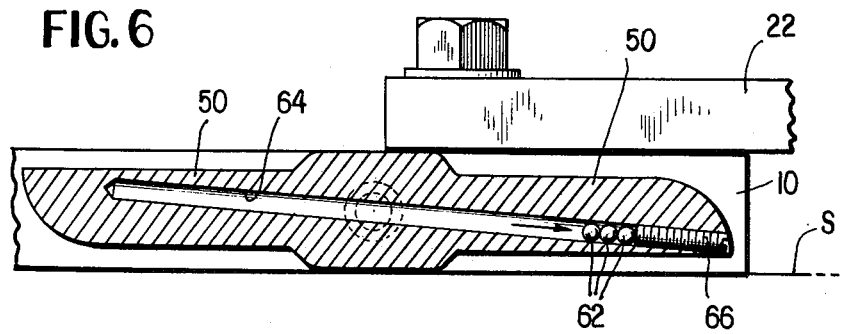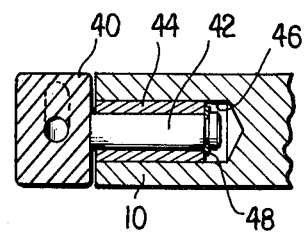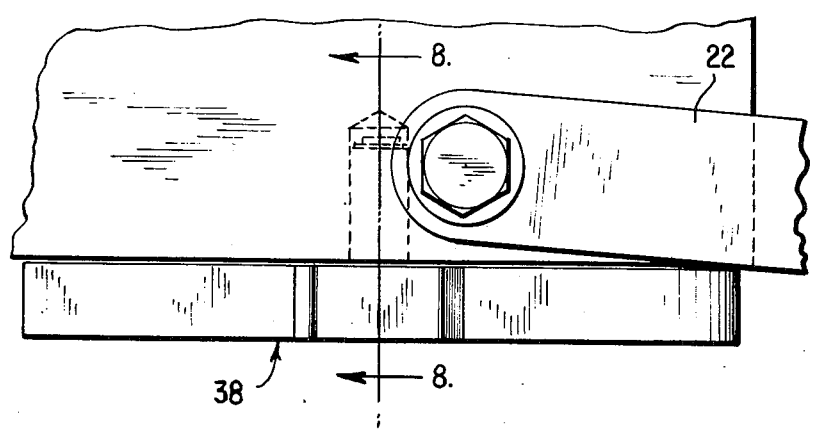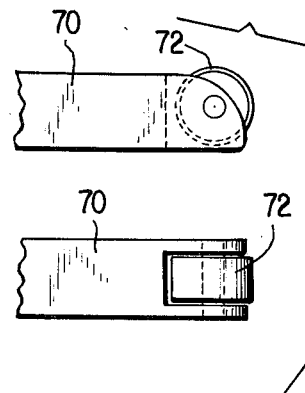

AUTOMOTIVE LIFT WITH AUTOMATICALLY RETURNING FRAME-ENGAGING ARMS

BACKGROUND OF THE INVENTION

This invention relates to lift devices for automotive or like vehicles wherein the lift device comprises a bed plate provided with laterally swingable arms which may be moved from an initial position in which the vehicle can straddle the entire assembly and be positioned thereover, to positions in which the ends of the arms are vertically aligned below the vehicle frame so that when the bed plate is elevated, the arms lift the vehicle correspondingly. This type of lift arrangement is very common at the present time and requires that the arms be positioned initially so that they project beyond the opposite ends of the bed plate, thus allowing the vehicle to be driven in straddling relation to the assembly. The operator then swings the arms laterally outwardly to position them in proper alignment with the vehicle frame and thereafter operates the mechanism to cause the vehicle to be elevated for servicing, inspection and the like. When the vehicle is returned back to the ground surface, the operator is required to swing each of the arms back to their initial positions wherein the vehicle can be driven away from its straddling position with respect to the lift device. This latter operation causes difficulties, particularly in such instances wherein the lift operator is required to perform other duties, such as is commonly the case in automotive service stations. Thus, the operator often will forget to return one or more of the arms to the vehicle-clearing position and the vehicle will be driven away while one or more of the arms is in its operative position, thus interfering with the vehicle and creating a condition of possible damage to the vehicle and/or to the lift device itself.

BRIEF SUMMARY OF THE INVENTION

The present invention seeks to overcome the problem as set forth hereinabove and to provide whereby the outwardly swung lift arms ar automatically returned to initial position allowing the vehicle to be driven away without interference with the lift arms.

In particular, the present invention is directed to an arrangement of the type described wherein each lift arm has associated with it a rotatable lever which is attached to the bed plate and which is so positioned relative thereto that when the lift device is lowered and the bed plate approaches the supporting surface, one end of each lever will strike the support surface and will impart rotation to the lever such that the opposite or upstanding end of the lever will sweep around and force the associated lift arm from its outwardly swung and operative position back towards the initial position thereof in which the vehicle can be driven away without interference from the lift arm.

Each end of each lever is provided with striker means which causes the lever to rotate in one direction when it strikes the support surface and each lever additionally is provided with shiftable weight means which causes the lever initially to rotate in that same direction from a horizontal attitude when the bed plate is initially elevated.

BRIEF DESCRIPTION OF THE DRAWING FIGURES

FIG. 4 is a side elevational view similar to FIG. 3 but illustrating the position of parts as the bed plate initially is elevated;

FIG. 5 is a view similar to FIG. 4 but showing the disposition of the parts and interaction therebetween as the bed plate is lowered;

FIG. 6 is a view illustrating the position of the components subsequent to complete lowering of the bed plate as depicted in FIG. 5;

FIG. 7 is a plan view of the section of the assembly illustrated in FIG. 6;

FIG. 8 is a transverse section taken substantially along the plane of section UK—VIII of FIG. 7; and FIG. 9 is a view illustrating a modified form of return lever.

DETAILED DESCRIPTION OF THE INVENTION

Figure 1:
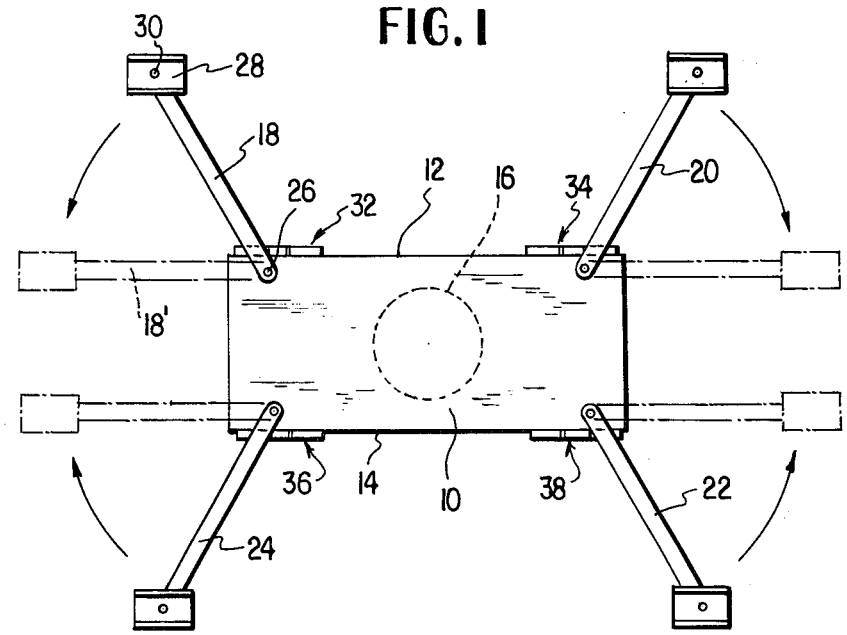
FIG. 1 is a plan view diagrammatically illustrating a left device according to the present invention.

Referring now to FIG. 1, a somewhat diagrammatic illustration of a conventional type of lift device for automobiles or the like is illustrated therein. This conventional assemblage includes a bed plate 10 having opposite sides 12 and 14 defining such a width as to allow the automotive vehicle or the like to be driven in straddling relationship over the bed plate 10. Also illustrated is the conventional lift piston 16 which is attached to the underside of the bed plate 10 as is well known and as is conventional in the art. The operating mechanism for the piston 16 ordinarily is by means of compressed air which operates upon the piston 16 same being received within a buried cylinder assembly.

The conventional type of lift device illustrated in FIG. 1 includes a series of arms 18, 20, 22 and 24 each of which is pinned or otherwise suitable pivoted as at 26 to the bed plate 10 so as to be movable between an inoperative position projecting beyond one end of the bed plate as is illustrated for example by the dashed line illustration at 18', to an outwardly swung position as is illustrated in full lines in FIG. 1 whereby the arms present end portions which are vertically aligned beneath portions of the vehicle frame. In the illustration of FIG. 1, each arm is shown provided with a frame-engaging pad 28 which is pivoted thereto as by means of a pin 30. It should be understood that the illustration of FIG. 1 and particularly of the components above described is merely diagrammatic to illustrate and describe the principle of operation of the class of lift devices with which the present invention is associated.

The invention according to the instant disclosure comprises, in association with the type of lift device described hereinabove, an automatic return lever means associated with each of the arms. These lever means are indicated in FIG. 1 by the reference characters 32, 34, 36 and 38.

Figure 2:
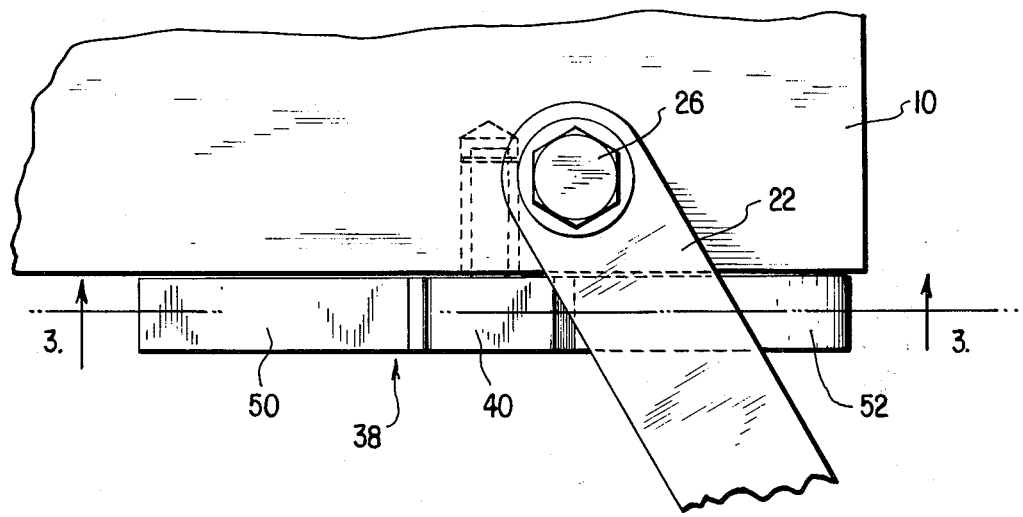
FIG. 2 is an enlarged portion of a section of FIG. 1 illustrating certain details of the present invention.
Figure 3:
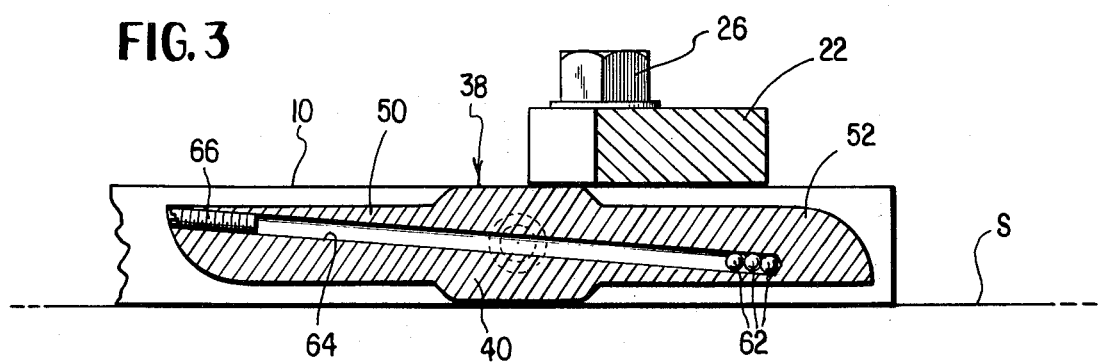
FIG. 3 is a vertical section taken substantially along the plane of section III—III in FIG. 2.

As will be evident from FIGS. 2, 3 and 8, each lever means is in the form of an elongate lever having an intermediate or boss portion 40 provided with a laterally projecting pin 42 received, for example, in a bushing 44 fitting within a bore 46 projecting into the side of the bed plate 10. The assembly may be retained for example by the ring 48 as is illustrated in FIG. 8.

Each lever further consists of the opposite end portions 50 and 52 as can best be seen in FIG. 3. It will be noted that when the bed plate 10 is disposed in its lowered position with respect to the supporting surface S, the lever is forced to attain a horizontal attitude as is illustrated in FIG. 3 and it will further be noted that the disposition and location of the lever means is such that it will provide clearance for the corresponding arm 22 to be swung outwardly to clear over in the fashion illustrated in FIG. 2. The disposition of the lever means is such that when the arm associated with it is disposed in an outwardly swung operative position, the inner end of the arm overlies one end of the lever means.

With the arm 22 thus outwardly swung and as the bed plate 10 is elevated as is illustrated in FIG. 4, the end 52 of the arm will rotate downwardly as is illustrated and indicated by the arrow 54 so that the opposite end 50 projects upwardly as illustrated. The end 52 is provided with striker means in the form of a rounded nose portion 56 and, likewise, the upper end 50 is provided with striker means in the form of the rounded nose portion 58, such rounded nose portions facing in opposite directions as for purposes which will be presently apparent. When the bed plate 10 is lowered as is illustrated in FIG. 5, a position will be reached in which the striker 56 will engage the supporting surface S and the camming action afforded by the striker means 56 will cause the lever means to rotate in the direction of the arrow 60, thus swinging the end 50 over into engagement with the arm 22 and, in the process, forcing the arm 22 back to the dashed line position illustrated in FIG. 1 automatically to return the corresponding arm to its inoperative position wherein the vehicle can clear when driven away from the lift device. At this point, as is illustrated in FIG. 6, the lever means 38 has once again attained its horizontal attitude but this time the end 50 of the lever points in the direction to underlie the arm 22 when the same is swung outwardly to its operative position. To assure that the lever mean rotates in the proper direction when the bed plate is elevated as illustrated in FIG. 4, shiftable weight means is associated with each lever means. In the embodiment illustrated, the shiftable weight means takes the form of a plurality of balls 62 which are freely received in the inclined bore 64 extending from one end of the lever means to the other, as is illustrated in FIG. 6. The inclination of the bore 64 is such that the balls 62 will always return to that end of the device which is positioned to be located beneath the corresponding outwardly swung arm. As illustrated, one end of the bore 64 may be suitably plugged as at 66 to retain the balls 62 and it will be appreciated, particularly with respect to the illustration shown in FIGS. 4, 5 and 6, that when the lever means is returned to the horizontal attitude when the bed plate 10 is lowered, the balls will travel by gravity to the proper end of the device. Thus, the direction of rotation of each lever means is always the same and when the bed plate is lowered back down to its lowered position against the supporting surface S, the arm associated with it will always be swung back to its initial or inoperative position as is illustrated in FIG. 7.

An alternative embodiment of the invention is illustrated in FIG. 9 wherein the ends 70 of each lever means are provided with striker means in the form of rollers 72 rather than being provided with the rounded nose portions 56 and 58 as is illustrated in FIGS. 1–7.

What is claimed is:

1. A lift device for automative vehicles, comprising in combination:
   a bed plate vertically movable between a lowered position relative to a support surface in which a vehicle may straddle it with clearance and an elevated position in which a vehicle likewise is elevated;
   at least one horizontally swingable arm pivotally attached to said bed plate and movable from an inoperative position allowing a vehicle to straddle the bed plate and an outwardly swung position underlying a portion of a vehicle frame; and
   automatic return lever means pivotally attached to said bed plate for returning said arm to an inoperative position during lowering of said bed plate to said lowered position thereof.

2. A lift device as defined in claim 1 wherein said return lever means includes a shiftable weight causing said lever means automatically to seek an operative position when said bed plate is elevated.

3. A lift device as defined in claim 2 wherein said return lever means is in the form of an elongate lever pivotally attached to said bed plate intermediate its ends.

4. A lift device as defined in claim 3 wherein each end of said lever is provided with a rounded striker means adapted to engage the support surface while the bed plate is being lowered.

5. A lift device as defined in claim 4 wherein each said striker means is in the form of a rounded nose surface on said lever.

6. A lift device as defined in claim 4 wherein each said striker means is in the form of a roller.

7. A lift device for automobiles and the like, comprising in combination:
   a bed plate vertically movable between a lowered position relative to a support surface and an elevated position relative thereto, said bed plate being of a width to allow a vehicle to straddle it when in said lowered position.
   at least a pair of arms pivotally attached to said bed plate, one arm being pivotally attached adjacent one side of said bed plate to be swung from an inoperative position projecting beyond an end of the bed plate to an outwardly swung position projecting beyond one side of the bed plate and into underlying position relative to a vehicle frame, the other arm being pivotally attached adjacent the other side of said bed plate to be swung from an inoperative position projecting beyond an end of the bed plate to an outwardly swung position projecting beyond the other side of the bed plate and into underlying position relative to a vehicle frame; and
   automatic return means for returning each arm to inoperative position during lowering of said bed plate to its lowered position.

8. A lift device as defined in claim 7 wherein said return means comprises a pair of levers, one of which is pivotally secured to said one side of the bed plate and the other of which is pivotally secured to the other side of the bed plate, each lever being rotatable in a vertical plane and each being of a length to engage, when rotated, a respective arm to force it toward said inoperative position.

9. A lift device as defined in claim 8 wherein each lever is forced to lie in horizontal attitude when the bed plate is in lowered position whereby to allow its respective arm to be swung outwardly thereover, the positioning of each lever on said bed plate being such as to present one end in underlying relation to its respective arm when the lever is horizontal and the arm is outwardly swung.

10. A lift device as defined in claim 9 wherein each lever includes shiftable weight means for shifting weight from one end of the lever to the other when in horizontal attitude and thereby causing that end of the lever underlying a respective arm to rotate downwardly when the bed plate is elevated whereby said that end projects below said bed plate and each lever including striker means at each end thereof for causing said that end of the lever to continue in its initial direction of rotation back to horizontal attitude when the bed plate is lowered.

* * * * *